(12) United States Patent
Delapierre et al.

(10) Patent No.: US 8,911,212 B2
(45) Date of Patent: Dec. 16, 2014

(54) TURBOMACHINE ROTOR WITH ANTI-WEAR SHIM BETWEEN A DISK AND AN ANNULUS

(75) Inventors: Michael Delapierre, Paris (FR); Patrick Jean-Louis Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 462 days.

(21) Appl. No.: 13/310,073

(22) Filed: Dec. 2, 2011

(65) Prior Publication Data

US 2012/0263597 A1  Oct. 18, 2012

(30) Foreign Application Priority Data

Dec. 3, 2010  (FR) ...................................... 10 60087

(51) Int. Cl.
*F01D 25/00* (2006.01)
*F04D 29/26* (2006.01)
*F01D 5/06* (2006.01)
*F01D 5/32* (2006.01)

(52) U.S. Cl.
CPC .............. *F04D 29/266* (2013.01); *F01D 5/066* (2013.01); *F01D 5/326* (2013.01); *F05D 2220/36* (2013.01); *F05D 2260/30* (2013.01); *Y02T 50/672* (2013.01); *Y02T 50/673* (2013.01)
USPC .................................. 416/220 R; 416/204 A

(58) Field of Classification Search
CPC ........ F01D 5/066; F01D 5/326; F01D 5/3015
USPC .......... 415/170.1, 174.2, 174.3, 174.5, 214.1; 416/220 R, 221, 204 A
See application file for complete search history.

(56) References Cited

U.S. PATENT DOCUMENTS

| 4,405,285 | A | | 9/1983 | Surdi | |
|---|---|---|---|---|---|
| 5,112,193 | A | * | 5/1992 | Greer et al. ................ | 416/220 R |
| 5,123,813 | A | * | 6/1992 | Przytulski et al. ............ | 416/221 |
| 5,282,720 | A | * | 2/1994 | Szpunar .................... | 416/220 R |
| 5,501,575 | A | * | 3/1996 | Eldredge et al. .............. | 416/144 |
| 5,584,658 | A | * | 12/1996 | Stenneler ...................... | 416/215 |

(Continued)

FOREIGN PATENT DOCUMENTS

| EP | 0 061 948 B1 | 2/1985 |
|---|---|---|
| EP | 1 091 089 A2 | 4/2001 |

(Continued)

OTHER PUBLICATIONS

French Preliminary Search Report issued Jul. 14, 2011, in French 1060087, filed Dec. 3, 2010 (with English Translation of Categories of Cited Documents).

*Primary Examiner* — Dwayne J White
*Assistant Examiner* — Justin Seabe
(74) *Attorney, Agent, or Firm* — Oblon, Spivak, McClelland, Maier & Neustadt, L.L.P.

(57) ABSTRACT

A turbomachine rotor including a disk with a rim and axial cavities machined into the rim to individually house blades; and an annulus attached to one side of the rim and pierced with stress-relief holes, in which part of the stress-relief holes are situated in the axial continuation of the cavities, is disclosed. An annular shim is attached and interposed between the disk and the annulus, the shim forming a removable device for closing off the holes and an axial bearing surface against which the blades housed in the cavities can bear.

9 Claims, 2 Drawing Sheets

(56) References Cited

U.S. PATENT DOCUMENTS

| | | |
|---|---|---|
| 6,283,712 B1 | 9/2001 | Dziech et al. |
| 6,595,755 B2 * | 7/2003 | Brioude et al. ........... 416/220 R |
| 2005/0249590 A1 | 11/2005 | Marchi |
| 2008/0003108 A1 * | 1/2008 | Forgue et al. ............. 416/219 R |
| 2008/0298972 A1 | 12/2008 | Le Hong |
| 2011/0027093 A1 | 2/2011 | Delapierre et al. |
| 2011/0033283 A1 | 2/2011 | Chrzastek et al. |

FOREIGN PATENT DOCUMENTS

| | | |
|---|---|---|
| EP | 1 950 381 A1 | 7/2008 |
| EP | 1 571 294 B1 | 12/2009 |
| FR | 2 929 660 | 10/2009 |
| WO | WO 2009124949 A1 * | 10/2009 |

* cited by examiner

TURBOMACHINE ROTOR WITH ANTI-WEAR SHIM BETWEEN A DISK AND AN ANNULUS

BACKGROUND OF THE INVENTION

1. Field of the Invention

The present invention relates to the field of gas turbine engines and is aimed in particular at a turbojet engine with a front fan.

2. Description of the Related Art

The rotor of the turbofan of an engine fitted to civilian aircraft comprises a disk driven by the low-pressure shaft and at the periphery of which a plurality of blades, extending axially, are held by their end that forms the root. In a commonplace type of structure the root of the blades is of dovetail cross section and these roots are housed in individual cavities machined in the rim of the disk in a substantially axial direction. Immediately downstream of the fan disk and making up the same rotor, is the boost compressor. This is in the form of a drum and comprises several blade stages.

The fan disk is secured to the drum of the boost compressor by being bolted to a radial flange thereof. The flange is also scalloped to form a means of axially retaining the blades of the fan disk. Each blade root, on its downstream side, is provided with an axial extension having two radial lateral slots and is engaged in a scallop in the flange of the boost compressor, as mentioned above, at the slots so as to be blocked against any axial movement.

In normal operation, the aerodynamic loadings on the fan blades have an axial component in the upstream direction. However, when the engine begins to windmill, the loadings on the blades reverse direction. Despite the aforementioned axial blockage there is a degree of play and the blades therefore move in the downstream direction. The part of the blade that forms the shank, between the dovetail root and the platform, then presses via its downstream transverse edge against the upstream flange of the drum of the boost compressor. This movement thus leads to friction causing wear which has been noted on the upstream face of the flange in the regions located in the continuation of the fan disk cavities.

Once this wear exceeds a certain depth it may have an impact on the life and integrity of the components in the event of the loss of a blade.

One problem associated with this phenomenon of wear stems from the presence, in these regions, of drillings which have been made to relieve the mechanical stresses in the flange. These stress-relief holes are generally closed by simple plastic plugs. The blade bearing against the flange in a region that has drillings is itself subject to erosion. Shank wear is therefore not uniform. The surface of the downstream face of the shank becomes worn only where it comes into contact with the flange; the surface portion that faces the drilling does not become worn and in the long-term becomes prominent. In addition to this phenomenon of blade wear, play develops between the blades and the flange.

Repair solutions have been proposed and these firstly consist in eliminating the worn zones by spot facing and then by reconstructing the reference surface facing the blade root. This latter operation uses plugs, known as anti-wear plugs, which are fitted tightly into the stress-relief holes of the drum.

The anti-wear plugs may be made of composite or of metal. The former has the advantage of wearing away far less rapidly than the latter. They are also more easy to remove when they need changing. By contrast, they do not have sufficient mechanical integrity when fitting the blades. For this reason, the anti-wear plugs are generally made of metal, but with a risk of damaging the drum during the fitting and removal operations that are needed to check the material health of the boost compressor drum stress-relief holes.

Specifically, the disadvantages are as follows:

There is a risk of creating defects when fitting the plugs.

Fitting the plugs is a tricky operation because the plug has to be a sliding fit in the orifice but a minimal shrinkage has to be observed in order to guarantee that it will remain in its housing during operation. This is achieved by a heating of the drum combined with a cooling of the plug. A significant temperature difference, in excess of 300° C., is needed.

Repairs are expensive requiring the machining of as many spot faces as there are fan blades, and an equivalent number of assembly operations.

Repairs have to be carried out at a specialist workshop which means down-time for the component, or even for the engine.

The drilling in the drum has to be rebored for each dismantling operation; that limits the number of replacements that can be done over the course of the life of the drum.

As an at least partial solution to these drawbacks, the applicant company proposed improvements that make it easier to fit the plugs; for example in Patent Application FR 2 929 660 the plug is in two parts, a metal part on the upstream side that is subjected to the friction stresses and a plastic part on the downstream side making fitting and removal operations easier. In the Patent Application filed on 28 Jul. 2009 under the number FR 0 903 695, the plug is arranged in such a way that it can be fitted and removed just from the upstream side of the drum.

The applicant company has set itself the objective of further improving the anti-wear device so as to simplify the carrying-out of the repair operation, to reduce fleet production and maintenance costs and eliminate the risk of damage to the boost compressor drum when mount fitting the plugs.

BRIEF SUMMARY OF THE INVENTION

The stated objective is achieved using a turbomachine rotor comprising a disk with a rim and axial cavities machined into the rim to individually house blades, an annulus pierced with stress-relief holes, part of the stress-relief holes being situated in the axial continuation of the cavities, being attached to one side of the rim, characterized in that an annular shim is attached and interposed between the disk and the annulus, the shim forming a removable means of closing off the said holes and an axial bearing surface against which the blades housed in the cavities can bear.

By interposing an annular shim annulus wear is prevented. The solution of the invention simplifies rotor repairs when wear stemming from the rubbing of the blade roots against the downstream annulus is observed. All that is required is for the annular shim to be replaced.

Because the shim forms a removable means of closing off the said holes there is no need to provide plugs for the stress-relief holes. It is, however, possible to provide a shim that has orifices corresponding to the stress-relief holes and to plug the latter using plugs; such a solution reduces the mass of the shim but does not solve the issue of non-uniform wearing of the shanks of the blades when the stress-relief hole is facing a cavity.

Advantageously, the annular shim is housed in an annular groove machined in the said annulus. This solution is particularly well suited to the repairing of a rotor that did not initially have an annular shim, when the annulus exhibits regions that have become worn by friction of the blades. An annular groove is machined that is of a depth sufficient to remove the thinned-down parts of the annulus and an annular shim is fitted. In this way, the causes of annulus wear are eliminated and the reference surface between disk and annulus is regained.

For preference, a polarising feature is arranged between the shim and its housing in the groove so that the component can be housed in the groove in only one way thus preventing it from being mounted the wrong way round. This then safeguards against potential careless and hasty fitting.

The polarising feature may be produced in various ways, notably by the shaping of respective sidewalls of the groove and of the annular shim. For example, the bottom of the groove may have a curved profile.

The annular shim may be made as a single piece but if need be can be made up of at least two sectors.

According to one embodiment, the annular shim is fixed to the annulus by bolts housed in fixing holes.

The invention also relates to an annular component shaped so that it can be used as a shim in a turbomachine rotor according to the invention.

More specifically, the component is made in a metallic material for those parts that are intended to come into contact with the disk and/or with the annulus and in a plastic material for those parts that are intended to come into contact with the root of the blades housed in the cavities. This then combines wear-resistance with compatibility between the metallic materials involved.

The invention also relates to a turbojet engine comprising a fan at the front and a boost compressor drum downstream of the fan, in which the fan disk and the boost compressor drum form a rotor according to the invention, the said annulus being secured to the compressor drum forming a flange thereof. The fan disk is fixed to the drum by bolting to the annulus and the shim is interposed between the disk and the drum. The fan disk is fixed to the annulus by fixing holes which are generally separate from the stress-relief holes.

BRIEF DESCRIPTION OF THE SEVERAL VIEWS OF THE DRAWINGS

Other features and advantages will emerge from the description which follows of some nonlimiting embodiments of the invention given with reference to the attached drawings in which.

DETAILED DESCRIPTION OF THE INVENTION

Figure 1:
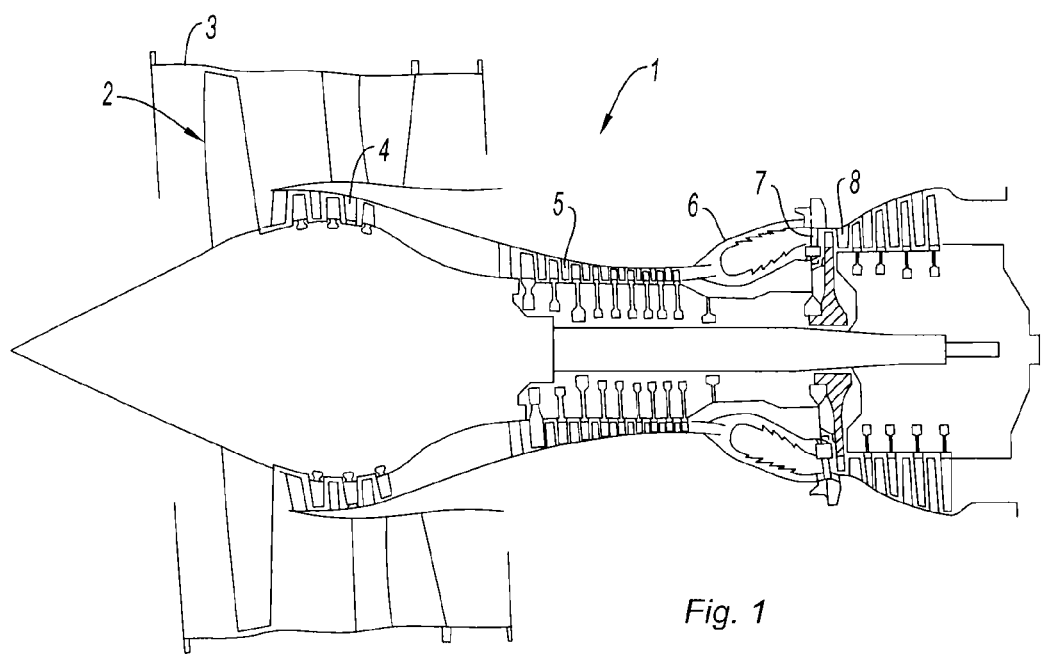
FIG. 1 is a view in axial section of a turbojet engine to which the invention can be applied.

FIG. 1 depicts an axial section through a twin-spool bypass turbojet engine 1. It comprises, at the front, a front fan 2 with a ducted rotor in a fan casing 3 which delimits the bypass airflow duct. The rotor 2 of the fan is secured to a low-pressure compressor 4 also known as the boost compressor. The entire fan 2 and boost compressor assembly is secured by a central shaft to a downstream turbine assembly that forms the low-pressure turbine 8.

Downstream of the boost compressor 4, the air is further compressed by the high-pressure compressor 5. The latter rotates as one with the high-pressure turbine stage 7 by which it is driven. The compressed air enters the combustion chamber 6 which produces the hot gases that drive the turbine stages.

In this example, the invention relates to that part of the engine situated between the fan rotor 2 and the rotor 4 of the low-pressure compressor.

Figure 2:
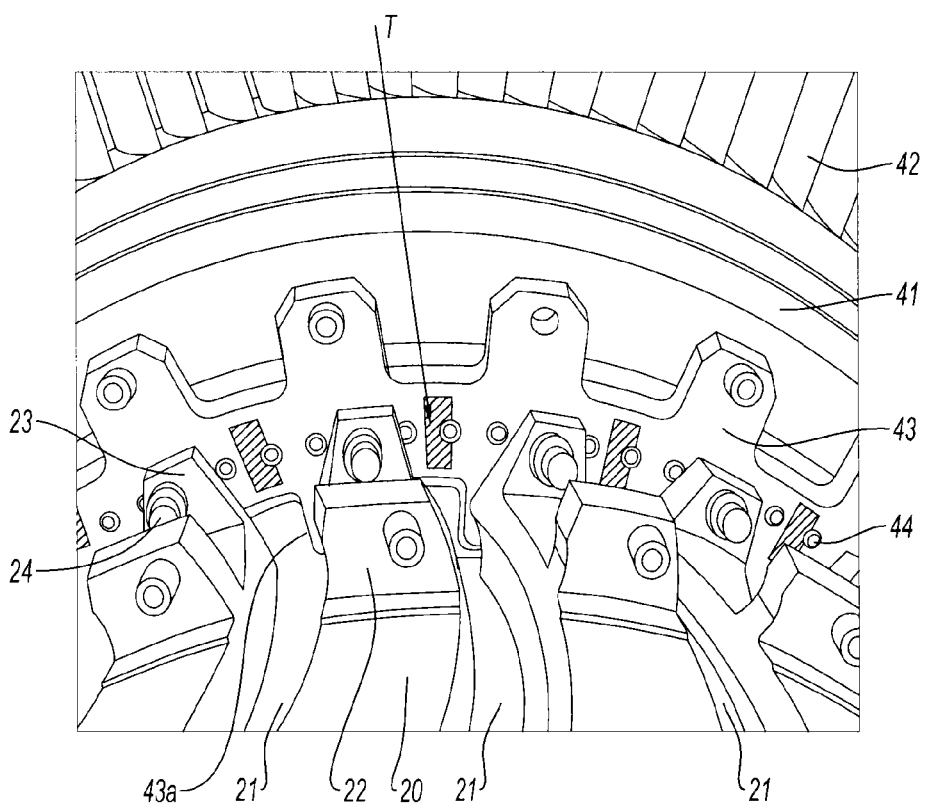
FIG. 2 is a perspective view of the details of a turbojet engine fan rotor from the side of the upstream flange of the boost compressor.

FIG. 2 is a perspective view from the upstream side of the interior of this zone from which, for the sake of clarity, the fan blades have been omitted.

The fan disk 20 on its rim comprises cavities 21 directed axially overall, which means along the axis of the engine, and here of curved shape. The cavities are of dovetail cross section in order to retain the blades radially. The rim comprises transverse radial flanges 22 between the cavities for fixing the inter-blade platforms that have not been depicted. The disk 20 is secured to the low-pressure compressor 40, also known as the boost compressor, situated downstream of it. The compressor 40 comprises a cylindrical drum 41 to which the compressor blades 42 that can be seen in part are fixed. Upstream, the drum is secured to a radial transverse flange 43 forming an annulus and to which the rim of the disk 20 is bolted. The rim comprises radial fixing flanges 23 between the cavities 21. Each radial flange 23 is fixed by a bolt 24 to the upstream flange 43 of the compressor. It will be noted that the holes present on the upstream flange 43 of the drum of the compressor do not all have the same function; there are fixing holes for connecting the disk to the drum and stress-relief holes which protect the connecting holes from the flow of circumferential stresses. The bolts 24 are housed in the fixing holes.

The upstream flange 43 has retaining scallops 43a with radial edges and which are open toward the axis of the machine. These scallops are used to retain the blades axially as the roots of these blades which are housed in the cavities 21 situated opposite are introduced therein. This way of retaining the blades is described in Patent EP 165 860 in the name of the applicant company. Between the fixing flanges 23 and on the same circle there are axial drillings 44 in the upstream flange 43 of the drum of the boost compressor 40. The purpose of these drillings, which will hereinafter be known as stress-relief holes, is to relieve the mechanical stresses to which this component is subjected. Sealing plugs close off the drillings and prevent air on the downstream side, inside the cavity of the drum, from escaping through the drillings to the upstream side where the pressure is lower. These sealing plugs are made of a synthetic material and perform no other function.

In operation, the engine may windmill with the loadings on the blades reversed. When this happens, the blades come to bear against the flange 43 via the downstream face of their shank. The pressure and movements of the blades lead to wear both on the blade and on the upstream flange. The position of the signs T of wear left by the shanks of the blades on the flange 43 have been indicated on this rotor. These signs of wear adopt the shape of the cross section of the shanks of the blades; this is of rectangular shape. They lie in the continuation of the cavities in which the blades are housed and notably straddle the drillings 44. This straddling of the bearing region leads to uneven wear of the shank with material around the part that faces the drilling being worn away.

The appearance of these regions of wear T can be avoided by fitting an annular shim against which the blades will press, thus sparing the surface of the flange of the drum.

Figure 3:
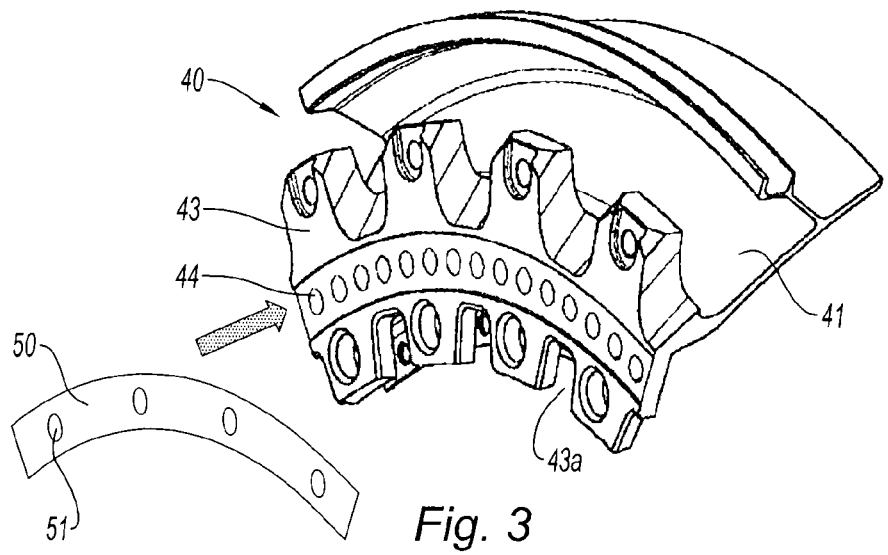
FIG. 3 is an exploded perspective part view of the upstream flange of the drum of the boost compressor with the annular shim according to the invention.
Figure 4:
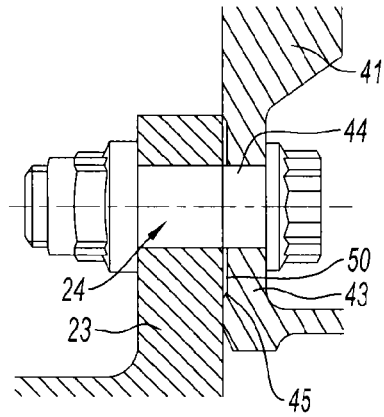
FIG. 4 is a partial axial section through a connecting bolt connecting the fan disk and the upstream flange of the drum of the boost compressor.

FIGS. 3 and 4 present a solution of the invention. This involves positioning an annular shim 50 that covers that part of the annulus that is made up of the flange 43 of the drum where these regions T occur, between the fan disk and the annulus. Thus, the regions against which the blades press are distributed about the periphery of this anti-wear shim. The wear generated by the rubbing of the blades is not prevented, but this wear is limited to the annular shim 50 which can easily be replaced.

The shim may be designed into the engine. However, the shim is advantageous in the case of repairs to a rotor that did not initially have one. In order to be able to fit this shim, an annular groove 45 is machined into the front face of the flange which, in the case of a repair, makes it possible to remove the metal that has been thinned down as a result of wear. This groove is wide enough to encompass all the drillings 44.

FIG. 3 shows that the shim 50 has orifices 51 distributed about its periphery. These orifices are for the passage of the bolts 24 to fix the fan disk to the drum of the boost compressor. By covering the stress-relief holes 44, the annular shim also performs the function of plugging these holes.

According to an alternative form of embodiment that has not been depicted, the shim comprises as many drillings as the upstream flange. That has the advantage of lightening the shim. However, it does not solve the problem of plugging the stress-relief holes and plugs therefore need to be provided.

FIG. 4 is a partial axial section through the connection between the fan disk 20 and the flange 43 of the drum. The shim 50 is interposed between the disk and the flange and is housed in the groove 45 machined in the flange 43. The depth of the groove 45 and the thickness of the shim 50 are preferably determined so that the face of the shim lies in the same plane as the upstream face of the flange 43.

The introduction of an intermediate component between the flange of the drum and the disk means that this component has to be made of a metallic material like the disk or the drum, notably titanium, or a metallic material with high mechanical strength such as the alloy known by the name of Inco781, so that the conditions of clamping-together of the two components are still maintained.

Figure 5:
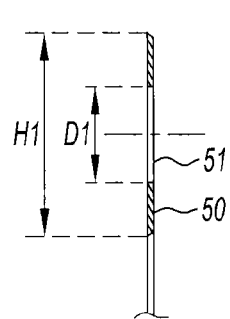
FIGS. 5 and 6 are partial views in axial section of the shim and of the groove in the flange of the drum.
Figure 6:
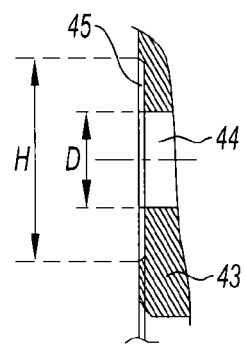

FIGS. 5 and 6 depict a cross section through the shim and the corresponding groove. The profile is defined in particular so that the shim can be mounted in the groove in just one way. Thus, wear on a shim cannot be concealed by turning the shim over when fitting it. In addition, the absence of holes corresponding to the stress-relief holes makes it possible to reduce the possibility of assembly error in terms of the angular positioning of the shim on fitting.

If D and D1 are the respective diameters of the holes 44, 51 in the flange and the shim, H and H1 are the respective widths of the groove and of the shim, p and Ep are the respective thicknesses of the groove and of the shim, and a and a1 are the respective angles of the bevelled edges of the groove and of the shim, then the preferred choice is: $D1>D$, $H>H1$, $a>a1$ and $Ep \leq p$. Rather than having a bevelled edge of planar section, it is possible to choose to round the edges, and the radii are adapted accordingly.

According to an alternative form of embodiment, the bottom of the groove and that face of the shim that sits in the groove are curved, and these are preferably machined in such a way that their profile follows a circular arc. In this case, the radius R of the groove needs to be greater than that R1 of the shim.

To sum up, in a repair situation, the solution of the invention has the following advantages over the fitting of plugs:

A circumferential groove is less expensive to machine than individual spot faces, of which for example there are 24.

Fitting a shim is simple, reliable and less expensive;
conventional fitting with polarising features to eliminate errors,
no risk of damaging the drum upon fitting,
fitting and removal can be performed under the wing, i.e. without return to the workshop,
the number of shim replacements is not limited by a machining of the stress-relief holes,
being trapped between the disk and the drum and housed in the groove, the shim remains confined and contained in the event of breakage,
the use of stress-relief hole sealing plugs is avoided.

The invention claimed is:

1. A turbomachine rotor comprising:
a disk with a rim and axial cavities machined into the rim to individually house blades;
an annulus pierced with stress-relief holes, part of the stress-relief holes being situated in an axial continuation of the cavities, the annulus being attached to a downstream side of the rim; and
an annular shim attached and interposed between the disk and the annulus, the shim being removable, closing off the at least one of the stress-relief holes, and presenting an upstream axial bearing surface against which the blades housed in the cavities can bear,
wherein an upstream face of the annulus includes an annular groove machined therein, the groove presenting a width in a radial direction which encompasses all of the stress-relief holes, and the shim being housed entirely in the groove such that the upstream face of the annulus is in a same plane as an upstream face of the shim,
wherein the annulus includes an upstream flange including retaining scallops at a radially inner edge of the upstream flange which open towards an axis of the annulus, the stress-relief holes being disposed radially outside of the scallops, and the groove being machined in an upstream face of the upstream flange.

2. The rotor according to claim 1, wherein a polarising feature is arranged between the annular shim and the groove so that the shim can be housed in the groove in only one way.

3. The rotor according to claim 2, wherein the polarising feature is formed by the shaping of respective sidewalls of the groove and of the annular shim.

4. The rotor according to claim 1, wherein the annular shim is made up of several sectors.

5. The rotor according to claim 1, wherein the annular shim is fixed to the annulus by bolts housed in fixing holes.

6. The rotor according to claim 1, wherein edges of the shim and edges of the groove are beveled, and an angle of the bevel of the groove is greater than an angle of the bevel of the shim.

7. An annular component shaped so as to be used as an annular shim in a turbomachine rotor comprising a disk with a rim and axial cavities machined into the rim to individually house blades, an annulus pierced with stress-relief holes, part of the stress-relief holes being situated in an axial continuation of the cavities, the annulus being attached to one side of the rim, in which the annular component is attached and interposed between the disk and the annulus, the annular component forming a removable means of closing off at least one of the stress-relief holes and presenting an upstream axial bearing surface against which the blades housed in the cavities can bear, wherein an upstream face of the annulus includes an annular groove machined therein, the groove presenting a width in a radial direction which encompasses all of the stress-relief holes, and the annular component being housed entirely in the groove such that the upstream face of the annulus is in a same plane as an upstream face of the annular component, and wherein a radial width of the annular component is greater than a diameter of the stress-relief holes, wherein the annulus includes an upstream flange including retaining scallops at a radially inner edge of the upstream flange which open towards an axis of the annulus, the stress-relief holes being disposed radially outside of the scallops, and the groove being machined in an upstream face of the upstream flange.

8. The annular component according to claim 7, wherein the annular component is made in a metallic material for those parts that are intended to come into contact with at least one of the disk or the annulus, and in a plastic material for those parts that are intended to come into contact with the root of the blades housed in the cavities.

9. A turbojet engine comprising a fan at the front and a boost compressor drum downstream of the fan, in which the fan disk and the boost compressor drum form a rotor according to claim 1, the annulus being secured to the compressor drum and the fan disk fixed to the drum by bolting to the annulus and the shim being interposed between the fan disk and the drum.

* * * * *